United States Patent [19]
Roth et al.

[11] Patent Number: 4,861,996
[45] Date of Patent: Aug. 29, 1989

[54] OBSERVATION AND GUIDE BEAM APPARATUS FOR DAY AND NIGHT USE

[75] Inventors: Siegfried Roth, Riemerling; Helmut Mueller, Eichenau, both of Fed. Rep. of Germany

[73] Assignee: Messerschmitt-Boelkow-Blohm GmbH, Munich, Fed. Rep. of Germany

[21] Appl. No.: 924,214

[22] Filed: Oct. 27, 1986

[30] Foreign Application Priority Data

Oct. 25, 1985 [DE] Fed. Rep. of Germany ....... 3538023

[51] Int. Cl.⁴ .............................................. H04N 5/33
[52] U.S. Cl. .................... 250/330; 356/152; 356/153
[58] Field of Search ............ 250/330, 334, 349, 252.1; 358/113; 356/153, 152, 150; 89/41.06

[56] References Cited

U.S. PATENT DOCUMENTS

| | | | |
|---|---|---|---|
| 3,867,764 | 2/1975 | Dunmire et al. | 33/241 |
| 4,200,251 | 4/1980 | Börjesson et al. | 250/330 |
| 4,266,873 | 5/1981 | Hacskaylo et al. | 250/333 |
| 4,407,009 | 9/1983 | Adamson, Jr. et al. | 250/330 |
| 4,432,640 | 2/1984 | Grage et al. | 356/152 |
| 4,542,986 | 9/1985 | Berdanier | 250/334 |

FOREIGN PATENT DOCUMENTS

| | | | |
|---|---|---|---|
| 3232092 | 3/1984 | Fed. Rep. of Germany . | |
| 3338496 | 5/1985 | Fed. Rep. of Germany . | |
| 2144880 | 3/1985 | United Kingdom | 356/152 |
| 2148663 | 5/1985 | United Kingdom | 250/330 |
| 2174862 | 11/1986 | United Kingdom | 250/330 |

*Primary Examiner*—Janice A. Howell
*Assistant Examiner*—William F. Rauchholz
*Attorney, Agent, or Firm*—W. G. Fasse; D. H. Kane, Jr.

[57] ABSTRACT

An observation and guide beam apparatus, referred to as a spotter scope, has in addition to a laser guide beam generator an optical daytime channel for daytime spotting or viewing and a day- and nighttime channel for both night and day observations. These channels are harmonized relative to the laser guide beam by the same automatic axial harmonizing device. Further, the day and night channel includes a heat imaging device that is internally harmonized on a long term basis. The scope also has an ocular arm. This combination is especially suitable for use in a weapons system using remote controlled flying bodies, for example. The scope can use any available type of detector or detector technology.

15 Claims, 3 Drawing Sheets

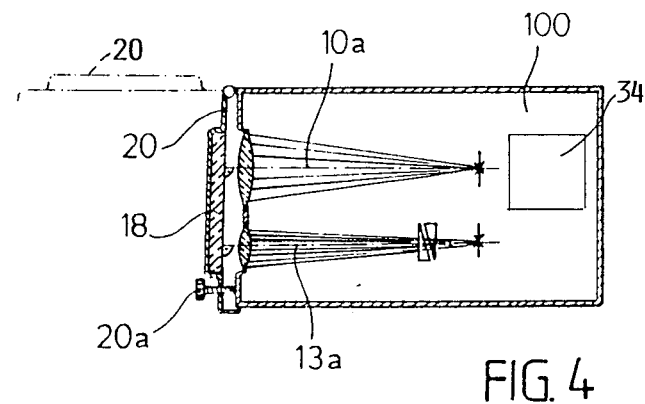
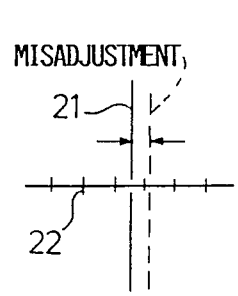
FIG. 4
FIG. 5
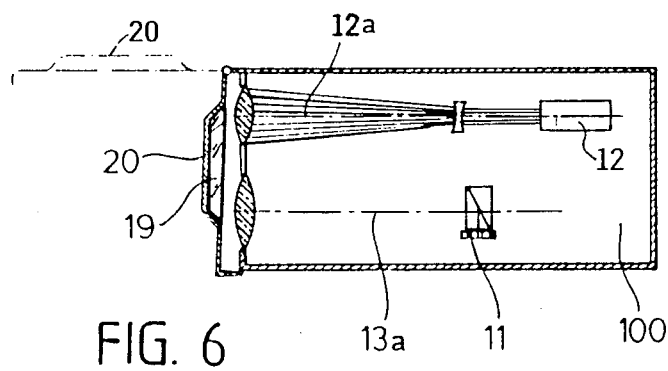
FIG. 6
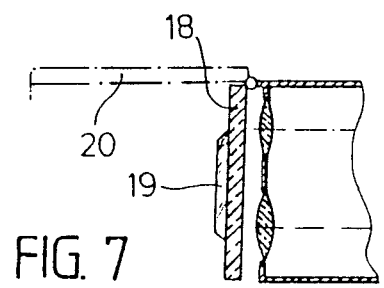
FIG. 7

OBSERVATION AND GUIDE BEAM APPARATUS FOR DAY AND NIGHT USE

FIELD OF THE INVENTION

The invention relates to an observation and guide beam apparatus for day and night use by a so-called "spotter". Such apparatus includes a night viewing system, a day viewing system, and a guide beam projector, as well as an arm supporting an eyepiece or ocular. For simplicity's sake the apparatus will be referred to as a "spotter scope" herein.

DESCRIPTION OF THE PRIOR ART

Different versions of spotter scopes are known in the art. One known spotter scope includes means for an automatic auto-collimation and harmonization. Portable spotter scopes, however, can so far not be provided with automatic harmonizing means since prior art harmonizing means are too complicated and too expensive for portable spotter scopes. Additionally, conventional harmonizing devices for three axes have the disadvantage that for each harmonizing operation all three axes require a follow-up adjustment.

It is also known from U.K. Patent Application No. 2,148,663 that the harmonizing of a heat imaging device including a cathode ray tube, relative to a daylight channel, is difficult with complicated means, and impossible with simple means. Therefore, the so-called "1:1-solution" has been employed in connection with the harmonizing of a heat imaging device with a daylight channel. However, even this "1:1-solution" has its disadvantages that cannot be disregarded. For example, the image reproduction or display is possible only with light emitting diodes, a secondary image can be obtained only with the aid of an additional television system.

Another disadvantage results when the heat imaging system is attached to the daylight system because this provides an additional optical intersection, so to speak, having two windows. Another drawback is seen in that three separate protection covers are necessary, and in that the arm carrying the imaging mirrors is unfavorable for a long duration axial harmonizing. Thus, this prior art approach of the so-called "1:1-solution" is not suitable for a subsequent installation in existing equipment. Incidentally, German Patent Publication (DE-OS) No. 3,338,496 describes an example of the so-called "1:1-solution".

German Patent (DE-PS) No. 3,232,092 discloses other day and nighttime spotter scopes in which a daylight periscope is combined with a heat imaging device and with a cathode ray tube which displays the heat image. In this system the imaging scale is again on a 1:1 ratio.

OBJECTS OF THE INVENTION

In view of the foregoing it is the aim of the invention to achieve the following objects singly or in combination:

to construct a spotter scope of the type mentioned above which is suitable for all weapons systems employing remote controlled flying bodies, and for all spotter requirements;

to construct such a spotter scope in such a way that the required auto-collimation and harmonizing is achievable in a simple manner; and to construct such a spotter scope that all types of detectors, or rather detector technologies, may be employed.

SUMMARY OF THE INVENTION

The spotter scope according to the invention is characterzied by a day-night viewing system which is internally harmonized on a long term duration, and which cooperates with an automatic axial harmonizing device for providing the harmonization relative to a guide beam projector. The spotter scope is further characterized by a daylight viewing system which uses the same automatic axial harmonizing apparatus for its harmonization relative to the guide beam projector, such as a laser beam generator.

BRIEF DESCRIPTION OF THE DRAWINGS

In order that the invention may be clearly understood, it will now be described, by way of example, with reference to the accompanying drawings, wherein:

FIG. 4 illustrates a sectional view along section line 3—3 in FIG. 2 to show the long term harmonization device, including an adjustment screw for adjusting the position of the cover;

FIG. 5 illustrates a reticle with adjustment markers and a display of a misadjustment;

FIG. 6 is a sectional view along section 1—1 in FIG. 2 for illustrating the harmonizing of the laser guide beam projector relative to the daylight sight or visor;

FIG. 7 illustrates a further embodiment for the harmonization similar to that of FIG. 6;

DETAILED DESCRIPTION OF PREFERRED EXAMPLE EMBODIMENTS AND OF THE BEST MODE OF THE INVENTION

Figure 1:
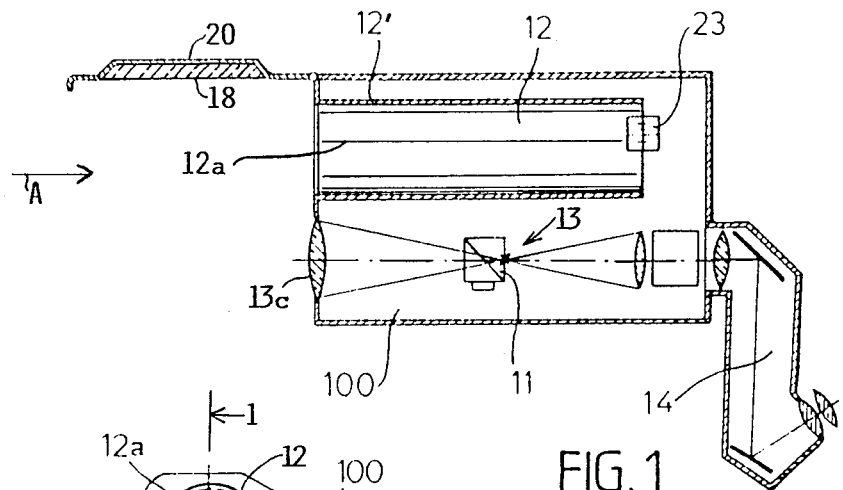
FIG. 1 shows a schematic sectional view along section line 1—1 in FIG. 2, of a daylight and night vision spotter scope having a protective cover shown in its open position and a harmonizing device.
Figure 2:
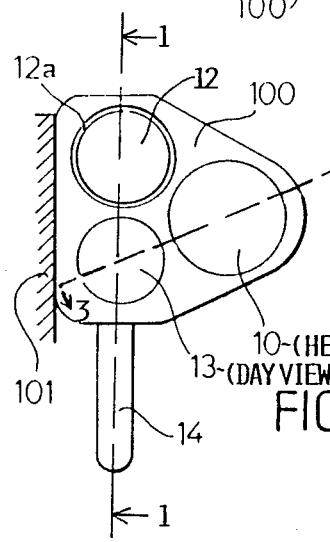
FIG. 2 is a front view of the apparatus according to FIG. 1, as viewed in the direction of the arrow A in FIG. 1.
Figure 3:
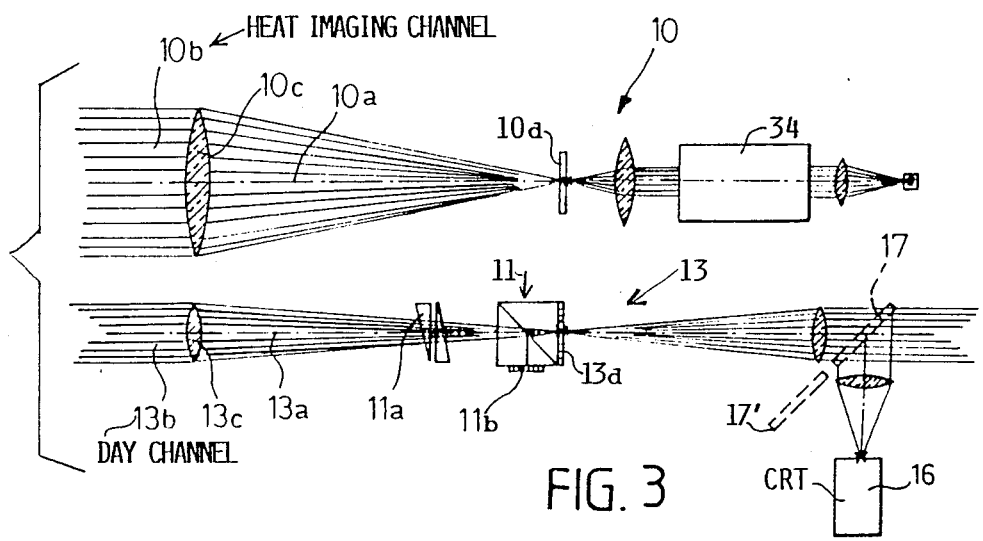
FIG. 3 is a schematic sectional illustration of further details of the spotter scope according to the invention along section line 3—3 in FIG. 2.

The spotter scope 100 shown in FIGS. 1, 2, and 3 comprises a daylight and night viewing system 10 which is internally harmonized on a long term basis. The system 10 comprises a heat imaging device 34 capable of daytime or nighttime viewing. The spotter scope 100 further includes a daylight viewing system 13 which is harmonized relative to the optical axis of a guide beam projector 12 by an automatic axial harmonizing device 11. The daylight and night viewing system 10 cooperates with the same axial harmonizing device 11 for achieving the required axial harmonization relative to the guide beam projector 12. The heat imaging device 34 of the system 10 is preferably internally harmonized. The entire spotter scope or unit 100 is housed in an insert which is connectable to a weapons system 101 by conventional means not shown. Such conventional means would, for example, include mechanical guide prisms for securing the unit 100 to the weapons system 101. The connection may also be accomplished by a conventional snap-in mechanism.

Referring to FIG. 3, the daylight and nighttime viewing system 10 comprises a first optical axis 10a forming part of the so-called night viewing channel 10b. A second optical axis 13a forms part of the daylight channel 13b of the daylight viewing system 13. The two optical axes 10a and 13a extend in parallel to each other. The axis 10a of the nighttime channel is determined by the objective lens 10c and by the line marker 10d. The optical axis 13a of the day channel is determined by the objective lens 13c and the line marker 13d. The line markers 10d and 13d are located in the focal plane. The parallelism between the axis 10a of the night viewing channel 10b and the axis 13a of the daylight channel 13b may be adjusted by an adjustment means comprising, for example, a plurality of optical wedges 11a. These optical wedges 11a are part of the above mentioned automatic axial harmonizing device 11. Both, the nighttime channel 10b and the daytime channel 13b are located in a common housing. Therefore, it is possible to achieve an optimal long term harmonization of both optical axes 10a and 13a. A cathode ray tube 16 provides the image display with the aid of a mirror 17 which may be switched from a display position in the daylight channel 13b into an inoperative position (shown as phantom lines 17' in FIG. 3) and vice versa. As mentioned, the system 10 includes the heat imaging device 34 of conventional construction. It is merely required that the heat imaging device 34 is compatible with a television display system. The heat imaging device 34 does not need to rely on any particular type of detector technology. The line marker 10d in the heat imaging device 34 can be constructed directly as a target marker or it may be merely a marker for the position of a target marker which is electronically produced.

Referring further to FIG. 2, the guide beam projector 12 may be a laser generator inserted in an insert tubular member 12' of the unit 100 and has an optical axis 12a. The tubular member 12' reaches into the common housing of the unit 100. The wavelength of the laser generator 12 should be about one micrometer to assure that a simple and automatic axial harmonization with the daylight channel 13b is possible. For this purpose the harmonizing device 11 in the daylight channel 13b comprises a detector array 11b for determining the position of the laser beam generated by the laser or guide beam generator 12. Incidentally, the ocular arm or operator unit 14 is also shown in FIGS. 1 and 2 and is used for both channels.

FIG. 4 show harmonizing means for achieving a long term harmonizing in the spotter scope or unit 100. The optical axis 13a of the daylight channel 13b is harmonized relative to the optical axis 10a of the heat imaging device 34 by the above mentioned optical wedges 11a which may be of the rotatable type or which may be replaced by a plane plate or similar adjusting elements. As shown, these elements are located in the daylight channel 13b. The optical axis 10a of the nighttime channel 10b is used as the reference axis and hence axis 10a is not adjustable. The degree of size of the misadjustment is determined by an auto-collimation as shown in FIG. 5. The line marker 10d provides a rated measure for the adjustment markers 22 of the reticle 21. The unit 100 has a hinged cover 20 which is simultaneously a protection device for the optical means as well as an optical device in the form of a plane mirror 18 which is used for the harmonizing. A simple adjustment screw 20a permits an adjustment of the cover 20 and thus of the plane mirror 18 relative to the optical axis 13a to thereby provide the required zero auto-collimation or zero adjustment.

FIG. 6 illustrates an embodiment in which the mirror 18 in the cover 20 has been replaced by a triple prism 19 for the harmonizing of the laser beam axis 12a with the optical axis 13a of the daylight channel. This triple prism 19 assures a proper harmonizing of the axes 13a and 12a by deflecting the laser beam into the daylight channel 13b. Thus, it is possible to perform the harmonizing when the cover is closed without any external adjustments.

In FIG. 7 the harmonizing is to be accomplished directly or immediately prior to the firing of the weapons system. For this purpose it is necessary that the cover 20 is in its open position as shown in FIG. 7. In this embodiment the plane mirror 18 and the triple prism 19 is tiltable independently of the cover 20 into the position shown in FIG. 7. Thus, the mirror 18 has a hinging mechanism independently of the hinge for the cover 20.

The electrical power supply means 23 shown in FIG. 1 may also be arranged entirely or partially in the weapons carrier 101 such as a tank or the like.

Figure 8:
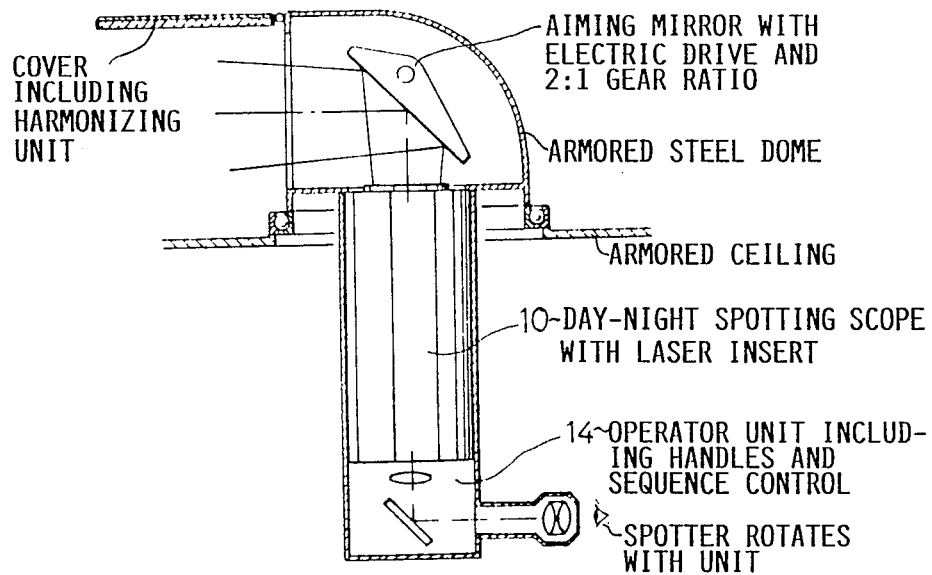
FIG. 8 illustrates a sectional view through a spotter scope according to the invention installed, for example, in an armored vehicle in which the spotter rotates with the entire unit.
Figure 9:
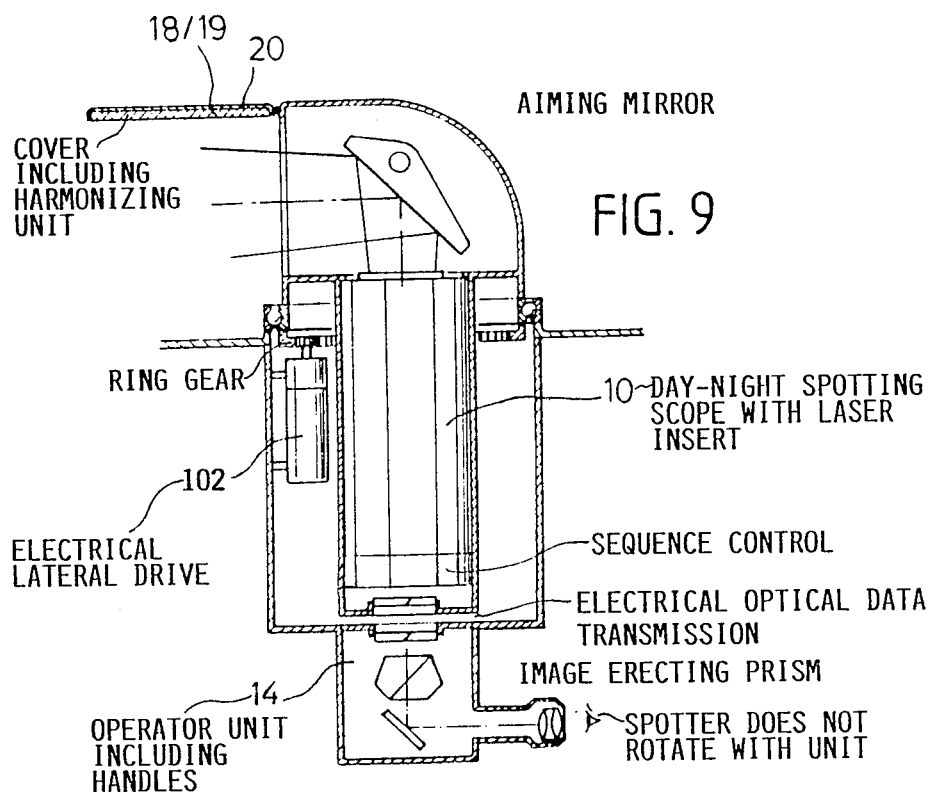
FIG. 9 is a view similar to that of FIG. 8, however illustrating a version in which the spotter does not rotate with the unit.

FIGS. 8 and 9 illustrate the present spotter scope incorporated in a turret of the weapons system, for example, a tank or the like. In FIG. 8 the spotter or operator rotates with the entire unit. In FIG. 9 the spotter or operator remains stationary while the unit is rotatable for an all around azimuth viewing. FIGS. 8 and 9 are otherwise self-explanatory having regard to the labels used in these Figs.

The invention has provided a spotter scope which is equally suited for an installation as shown in FIGS. 8 and 9 or for a portable unit. A separate drive 102, for example, including an electrical motor and a respective gear, rotates the aiming mirror in its dome which can be closed by the above described cover 20.

Although the invention has been described with reference to specific example embodiments, it will be appreciated, that it is intended to cover all modifications and equivalents within the scope of the appended claims.

What is claimed is:

1. An observation and guide apparatus comprising a first viewing system (10) including first means suitable for night viewing or day viewing, said first means including a channel (10b) having a first optical axis (10a), said apparatus further comprising second means (13) forming a daylight channel (13b) having a second optical axis (13a), said first and second optical axes (10a and 13a) being harmonized with each other on a long term basis, a guide beam projector (12) for generating a guide beam defining a third optical axis (12a), an ocular arm (14) optically connected to both said first and second means, and axial harmonizing means (11) provided for automatically harmonizing said first and second optical axes (10a and 13a) with said third optical axis of said guide beam projector (12), said apparatus further comprising means for statically and mechanically fixing said first and second optical axes (10a and 13a) in a rigid position, said harmonizing means including adjusting means (11a) arranged in said second optical axis (13a) of said daylight channel (13b) for enforcing a parallelism between said first and second optical axes (10a and 13a), such that the apparatus is especially useful for weapons systems using remote controlled weapons.

2. The apparatus of claim 1, further comprising means for removable attachment of said first and second means to a weapons carrier, and wherein said first means comprises a harmonized heat imaging device (34).

3. The apparatus of claim 1, further comprising a cathode ray tube (16) for an image display and a mirror (17) which is tiltable into and out of said second optical axis (13a) of said daylight channel (13b), and a fixed line marker (10d) located in a focusing plane of said first means (10), said mirror (17) being arranged for directing an image to said cathode ray tube for an image display.

4. The apparatus of claim 1, further comprising a housing unit (100) for inserting said guide beam projector (12), said first means (10) and said second means (13) into said housing unit, said guide beam projector comprising a laser generator for projecting a laser guide beam.

5. The apparatus of claim 4, further comprising a detector array (11b) located in a beam path of said second means for determining the location of the laser guide beam.

6. The apparatus of claim 1, further comprising power supply means which are completely or partially located in a weapons carrier.

7. The apparatus of claim 1, further comprising a line marker which may be used either directly as a target marker or for the position determination of an electronic line marker.

8. The apparatus of claim 1, further comprising means for auto-collimating said first and second optical axes (10a and 13a), said axial harmonizing means (11) comprising a tiltable optical harmonizing member, said auto-collimating means being arranged axially in parallel to said tiltable optical harmonizing member, and means for adjusting an angle of said auto-collimating means relative to said second optical axis (13a).

9. The apparatus of claim 8, further comprising hinged cover means for protecting said guide beam projector and said first and second means.

10. The apparatus of claim 9, wherein said auto-collimating means are arranged in said cover means.

11. The apparatus of claim 10, wherein said auto-collimating means are tiltable with said cover means.

12. The apparatus of claim 10, wherein said auto-collimating means are tiltable independently of said cover means.

13. The apparatus of claim 8, wherein said auto-collimating means comprise a plane plate mirror (18).

14. The apparatus of claim 8, wherein said auto-collimating means comprise a triple prism (19).

15. The apparatus of claim 8, wherein said auto-collimating means comprise a plane plate mirror (18) and a triple prism (19).

* * * * *